Aug. 18, 1942.    P. K. HERMANN    2,293,502
ELECTRIC MEASURING APPARATUS
Filed April 10, 1940
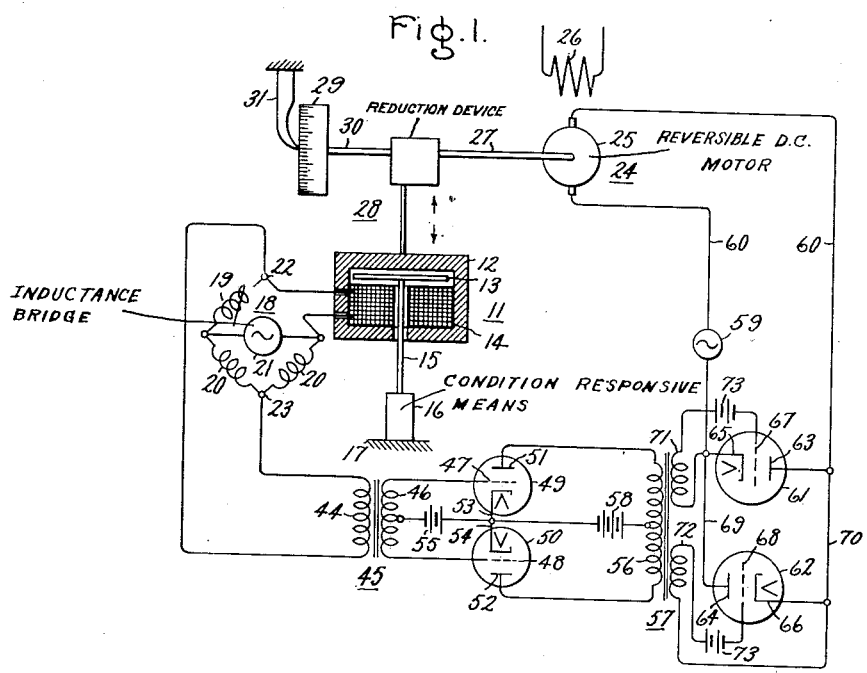
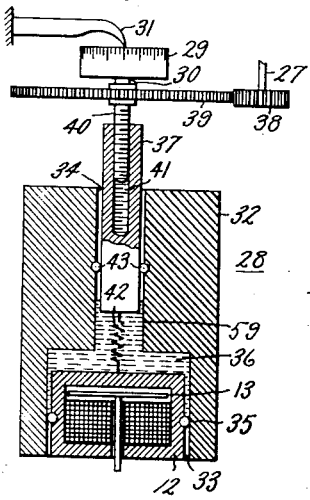
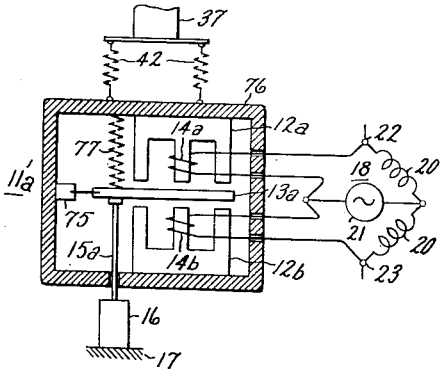
Inventor:
Peter K. Hermann,
by Harry E. Dunham
His Attorney.

Patented Aug. 18, 1942

2,293,502

UNITED STATES PATENT OFFICE 2,293,502

ELECTRIC MEASURING APPARATUS

Peter Konrad Hermann, Berlin-Zehlendorf, Germany, assignor to General Electric Company, a corporation of New York Application April 10, 1940, Serial No. 329,001
In Germany April 13, 1939

3 Claims. (Cl. 171—95)

This invention relates to electric measuring apparatus and more particularly to electric measuring apparatus including electric gages of the electromagnetic induction type in which an induction coil links a magnetic circuit and in which the variation of an air gap in this magnetic circuit an amount corresponding to a given dimension, or other quantity to be measured produces a corresponding change in the inductive reactance of the coil.

It is an object of my invention to provide new and improved electric measuring apparatus including an electric gage of high sensitivity which employs the "null" or zero balance principle of operation.

It is another object of my invention to provide an electromagnetic induction type measuring gage which is adapted to operate over a wide range of measurement.

It is a further object of my invention to provide an electromagnetic gage in which the measuring sensitivity is independent of the absolute magnitude of the measured quantity. Other objects and advantages will become apparent as the description proceeds.

In carrying out my invention in its preferred form, an electromagnetic gage coil which links a magnetic circuit is connected in an automatically balancing Wheatstone bridge circuit. In making the measurement, a movable spindle or feeler element adjusts a movable armature of the magnetic circuit thereby varying an air gap formed between the magnetic member positioned about the coil and the movable armature. The resulting change in the reactance of the coil unbalances the bridge and causes a follow-up system to move the coil and that portion of the magnetic circuit which is associated with the coil until the bridge is again in balance. The degree of adjustment or movement necessary to balance the bridge is an indication of the magnitude of the dimension or displacement being measured, and is rendered manifest by connecting a pointer or scale to be actuated simultaneously with the adjustable gage member.

Since the system is always automatically rebalanced until the potential across the bridge is zero, it is not susceptible to inaccuracies caused by varying conditions, and an electronic amplifier may be used to make the system extremely sensitive.

My invention, however, will be best understood from the following description when considered in connection with the accompanying drawing while those features of the invention which are believed to be novel and patentable are pointed out in the appended claims. In the drawing, Fig. 1 is a schematic diagram of apparatus arranged in accordance with my invention and showing a sectional elevational view of an induction measuring device with the induction coil of the device arranged in a Wheatstone bridge circuit; Fig. 2 is an elevational view partly in section of apparatus employed in the arrangement of Fig. 1; and Fig. 3 is a view of a modified form of an electromagnetic gage element which may be employed in carrying out the principles of my invention.

As stated heretofore, I employ the "null" or zero balance method of measurement wherein variations in an electrical effect are produced in accordance with variations in the measured quantity and the amount of adjustment required to maintain this electrical effect at a substantially constant value thus becomes a measure of the variable or quantity to be measured.

Referring to Fig. 1 of the drawing, there is illustrated a magnetic gage head 11 having two relatively movable magnetic members 12 and 13 and a coil 14. The members 12 and 13 together with the field of the coil 14 form an inductance. The magnetic member 12 serves as a yoke for the flux produced by the coil 14 and at least partially encloses it. The other magnetic member 13 comprises a movable armature element which is secured to and is positioned by a spindle or feeler gaging element 15 in accordance with the dimension or displacement being gaged. In the illustration shown the feeler element 15 is positioned for measuring a dimension of or a dimensional change in a body 16 one end of which rests on or is secured to a fixed support 17. It will be appreciated that if the coil 14 is associated in an alternating current circuit, a change in the position of the armature element 13 relative to the magnetic member or yoke 12 will produce a change in the impedance of the coil. This change in impedance may be employed to measure the length of or detect dimensional changes in the body 16.

The induction coil 14 is shown connected in one of the arms of a Wheatstone bridge 18. The Wheatstone bridge 18 comprises in addition a so-called dummy or balancing induction coil 19 connected adjacent the induction coil 14, and two like impedance elements 20 connected in the remaining arms of the bridge. The bridge may be energized across one of its conjugate portions by a suitable source of alternating current 21, while an output voltage having a magnitude proportional to the degree of unbalance and a polarity determined by the direction of unbalance may be taken from the other conjugate portion by means of a pair of output terminals 22 and 23.

In employing the "null" or zero balance method of measurement the magnetic members 12 and 13 occupy a so-called "normal" position relative to each other, at which time the bridge is balanced, which position is disturbed by the quantity to be measured, and the magnetic member 12 and its associated coil 14 are moved relative to the armature 13 until the bridge in which the coil is connected is rebalanced and the amount of movement required to produce this balance becomes a measure of the variable to which the gage responds. In the arrangement illustrated, movement is imparted to the magnetic yoke 12 and the induction coil 14 in the vertical direction, as indicated by the arrows, by means of a suitable electromagnetic driving mechanism, here shown as a reversible dynamo-electric machine 24 of the direct current type having an armature member 25, and a field winding 26 which may be energized from any suitable source of direct current. As will be hereinafter described, the voltage output from the bridge 18 controls the operation of the motor 24 including its direction of rotation. The armature member 25 is connected through a rotary shaft 27 to a transmission mechanism 28 for controlling the movement of the yoke 12 and the coil 14 in the vertical direction. The mechanism 28 preferably comprises an hydraulic reduction device in order that a relatively large movement of the motor armature 25 shall be required to produce a small movement of the yoke member 12. A suitable mechanism which may be used will presently be described in connection with Fig. 2. A cylindrical scale 29 driven by the spindle 30 an amount proportional to the movement of the yoke 12 and the armature 25 cooperates with a fixed index 31 to indicate the extent or degree of adjustment required to re-balance the bridge.

In Fig. 2 I have illustrated an elevational view partly in section of the hydraulic transmission mechanism 28 which when operated by the motor armature 25 through the shaft 27 adjusts the yoke 12 and coil 14 to maintain the bridge 18 in balance. According to the embodiment disclosed, there is provided a suitable housing 32 of a suitable diameter and an upper portion 34 of considerably smaller diameter. The induction measuring device 11 is positioned in the lower recess or chamber 33 with a suitable sealing ring 35 interposed between the outer surface of the yoke 12 and the vertical surface of the chamber. That upper portion of the chamber 33 which is sealed off and the lower portion of the recess 34 are filled with a suitable inactive fluid such as mercury or oil.

Within the upper chamber or recess is also positioned a vertically movable member 37 in the form of a piston or plunger which is adapted to be adjusted either up or down from a given position by rotation of the motor armature 25. In the system shown a pinion 38 operated from the motor shaft 27 drives a larger diameter gear 39 which in turn operates a micrometer or adjusting screw 40 engaging a threaded recess 41 of the piston 37. Thus, the piston will be moved up or down depending upon the direction of rotation of the motor armature 25. The plunger or piston 37 is connected to the yoke member 12 by a resilient member such as spring 42 in order to insure against sticking of the gage head 11. A suitable sealing device 43 similar to the member 35 may be provided between the outer surface of the plunger 37 and the vetrical surface of the recess 34. The elements 35 and 43 thus serve to confine the fluid medium 36 in the upper and lower recesses 34 and 33, respectively.

Thus if, for example, during the measurement the armature element 13 is moved upward, the change produced thereby in the inductance of the coil 14 produces an unbalance of the bridge 18 thereby causing the driving motor armature 25 to rotate in a direction to move the piston 37 upward, and through the hydraulic transmission, the yoke 12 and the coil 14 of the measuring device 11 are raised by the same amount as the original upward movement of the armature 13 until the bridge 18 is again in balance. The amount of rotation by the armature 25 and the micrometer screw is one measure of the movement of the yoke 12 and is thus a measure of the movement of the armature 13 or the quantity to be measured. The measure of the displacement can be read off on the scale 29, operated by the micrometer screw, by the index 31. It will be seen that due to the large discrepancy in the diameters of the two chambers 33 and 34, a relatively large movement of the plunger or piston 37 is required to produce a small movement of the yoke 12 and the coil 14. This factor contributes to the accuracy of the indication obtained since the scale 29 which is driven by the spindle 30 has a correspondingly large rotary movement.

I provide a sensitive automatic device in the form of an electric valve translating system for controlling the degree of energization and direction of rotation of the armature 25 of the direct current motor 24 in accordance with the degree and direction of unbalance of the bridge 18. This translating system comprises an electronic amplifier with "directional" characteristics. If the bridge is balanced with the armature 13 in a so-called "neutral" position, and the armature 13 is then moved to one side of this neutral position, it will be appreciated that the impedance of the coil 14 will change and an alternating current voltage will appear across the output terminals 22 and 23 of the bridge of a given polarity or phase position relative to the supply voltage 21. If now the armature element 13 is moved to the other side of the neutral position the voltage at the output terminals 22 and 23 of the bridge will be in phase opposition to the voltage which appeared across these terminals when the armature was on the opposite side of the neutral position. In other words, the direction of rotation of the armature member 25 is made to depend upon the sign of the variation of the inductance of the coil 14. The absolute magnitude of the voltage at the bridge output terminals 22 and 23 will of course depend upon the relative displacement between the yoke 12 and the armature 13, and, as will presently appear, the greater the magnitude of this voltage the faster and greater will be the adjustment to restore the balance of the bridge.

Referring now to Fig. 1, the bridge output terminals 22 and 23 are connected to the input circuit of an electronic amplifier comprising a primary winding 44 of a transformer 45. The opposite terminals of a secondary winding 46 of the transformer 45 are connected to the control electrodes 47 and 48 of a pair of electron discharge amplifying devices 49 and 50 having anodes 51 and 52 and cathodes 53 and 54, respectively. A suitable source of biasing potential such as a battery 55 is connected between the respective cathodes 53 and 54 and the midpoint of the secondary winding 46. The respective anodes 51 and 52 of the electron discharge devices 49 and 50 are connected to opposite terminals of a primary winding 56 of a transformer 57. A suitable source of anode potential such as a storage battery 58 is connected between the cathodes 53, 54 and the midpoint of the winding 56.

Assuming that the bridge 18 is balanced so that no voltage appears across the winding 44, the biasing potential 55 may be adjusted so that the electronic devices 49 and 50 pass currents of predetermined magnitude through their output circuits or, of desired, the control electrodes 47 and 48 may be sufficiently biased so that both devices are normally substantially non-conductive. However, when an alternating voltage of one polarity is impressed on the transformer winding 44, for one half cycle the control electrode of one of the electronic devices will be made more positive with respect to its anode whereas the control electrode of the other electronic device will be made more negative with respect to its anode. For the other half cycle, the reverse will occur. Similarly, with the polarity or phase position of the alternating voltage changed 180 electrical degrees, at a particular instant of time, opposite effects will be produced in the output circuits of the devices 49 and 50. Thus it will be apparent that with an alternating voltage applied to the input of the amplifier a pulsating current will pass through the output circuits of the devices 49 and 50 and the polarity of this current at a particular instant of time relative to the source 21 will depend upon the sense of change in the inductance of the coil 14.

The pulsating current passing through the output circuits of the devices 49 and 50 is utilized to control the flow of current from an alternating current source of supply 59, of substantially the same frequency as the source 21, to energize a direct current circuit 60 leading to an electromagnetic device which in this instance is the armature of the motor 24. A pair of oppositely disposed electric valve means 61 and 62 having anodes 63, 64, cathodes 65, 66, and control electrodes 67, 68, respectively, provides a directional system whereby the motor armature 25 is always operated in a direction to adjust the bridge 18 to a balanced condition. The electric valve means 61 and 62 are preferably of the type employing ionizable mediums such as gases or vapors. The cathode 65 of the electric valve 61 and the anode 64 of the electric valve 62 are connected together by means of a conductor 69, and the anode 63 of the electric valve 61 and the cathode 66 of the electric valve 62 are connected together by means of a conductor 70. A pair of windings 71 and 72 of the transformer 57 are inductively coupled with the primary winding 56 so that these elements impress on the control electrodes 67 and 68 of the electric valves 61 and 62 potentials which vary in accordance with the voltage appearing across the terminals of the input winding 44. Connected in series with the upper terminals of each of the windings 71 and 72 is a source of biasing potential such as a storage battery 73. It will be noted that the windings 71 and 72 are arranged so that the potentials impressed on the control electrodes 67 and 68 of the electric valves 61 and 62 are substantially in phase relative to each other.

The biasing potentials 73 may be so adjusted that both of the devices 61 and 62 are normally non-conductive, or they may be adjusted so that normally alternating current will flow from the source 59 through the armature 25 of the motor 24. The former method of adjustment may in some cases be the preferred one. At any rate when an alternating current voltage of a given polarity appears at the output terminals of the bridge one of the valve means 61 and 62 will become more conductive or pass more current than the other so that the resultant current tends to produce rotation of the motor in one direction. Similarly, a reversal in the polarity or phase position of the alternating current voltage at the bridge output terminals will produce rotation of the motor in the opposite direction. Hence, by the terms "more conductive" I intend to include the arrangement in which the valves 61 and 62 are normally biased to cut-off so that an alternating current voltage at the bridge causes one of the valves to become conductive while the other valve remains non-conductive. By these terms it is also my intention to include the arrangement in which the valves normally carry opposite half cycles of alternating current but have their conductivities changed by the appearance of an alternating current voltage at the bridge output terminals, since in this case, depending upon the phase position or polarity of this voltage relative to the voltage 59 applied to the respective anodes of the valves 61 and 62, one of the valves will pass less current during the half cycle that it passes current, while the other valve will pass more current. As a result the armature 25 will rotate in a direction dependent upon the polarity of the average or resultant current.

In explaining the operation of the embodiment of my invention which is diagrammatically illustrated in Figs. 1 and 2, it will be obvious in view of the foregoing discussion that with the bridge unbalanced in one direction the periodic potential impressed on the control member 67 of the electric valve 61, for example, will be substantially 180 electrical degrees out of phase with the potential impressed on the anode 63 of this valve from the alternating current source 59, thereby causing this valve to remain non-conductive or to become non-conductive or less conductive depending upon the biasing arrangement employed. However, since the electric valve 62 is oppositely disposed relative to the electric valve 61, the potential impressed on the control member 68 of the electric valve 61 will be substantially in phase with the potential impressed on the anode 64 of the electric valve 62, thereby causing this valve to become conductive if it was originally biased to cut-off or to pass more current as the case may be. As a result a current having unidirectional characteristics is caused to flow through the circuit 60 to the armature member 25 of the dynamo-electric machine 24. The armature member 25 will thus rotate in a direction to move the yoke 12 and the coil 14 a sufficient amount to rebalance the bridge 18, and the amount of adjustment or movement required to effect a balance may be read off on the scale 29 by the indicator 31.

Similarly, if the bridge is unbalanced in the opposite direction, that is, if the inductance of the coil 14 is changed in the opposite sense thereby causing a shift in phase of 180 electrical degrees in the voltage applied to the input winding 44, the relative conductivites of the two valves 61 and 62 will be reversed effecting thereby a reversal in the direction of rotation of the motor armature 25. It will thus be seen that the valves 61 and 62 are selectively controlled in accordance with the change in the impedance of the coil 14 as determined by the magnitude of the measured quantity.

I wish to point out that while I have shown storage batteries for the sources of biasing potential 55 and 73, any other suitable self-biasing arrangement may be employed if desired.

In Fig. 3, I have shown a modified form of gage head 11' which may be employed with my invention in which a plurality of induction coils 14a and 14b are positioned on opposite sides of a movable armature member 13a. These coils are connected in adjacent arms of a Wheatstone bridge circuit as shown. With this arrangement when the armature 13a is moved from the neutral position, the impedance of one coil increases while that of the other decreases, thereby resulting in a greater voltage output from the bridge for a given armature displacement. The magnetic armature 13a, in the form of a steel bar, is pivoted at one end by a flat steel spring 75 which is secured to an outer casing 76. The casing 76, which may be composed of a suitable material such as aluminum, encloses the gage parts and is adapted to be positioned in the lower chamber 33 of the member 32 in much the same manner as the yoke 12 of Figs. 1 and 2. Due to the increased size of this arrangement it may be found desirable to use a plurality of springs 42 for connecting the casing 76 with the movable plunger 37. The coils 14a and 14b are shown wound about the central legs of E-shaped magnetic cores 12a and 12b, respectively, and these cores are in turn secured to the casing 76 so that both the cores and the coils move therewith. A spindle or feeler element 15a one end of which bears against the body or work 16 controls the actuation of the armature element 13a. A helical compression spring 77 which is attached to the casing 76 urges the armature 13a downward to hold the latter in contact with the spindle or feeler element 15a.

It will be seen that by the use of the present invention the armature element is never required to move very far with respect to the induction measuring coil or coils so that unbalanced magnetic forces and varying spring forces are practically eliminated. Consequently, the bridge output is made more nearly directly proportional to the quantity or variable to be measured.

I have thus provided a sensitive measuring device, which is accurate and which is adaptable for use over a wide range. It may be employed for the measurement of relative displacements produced by a variable of a physical, chemical or electrical nature so long as the variable or quantity to be measured is capable of influencing the movement of the armature element relative to the induction coil and its associated magnetic circuit. For example, in addition to the use of a gage of this character for measuring the dimensions of machined parts and the like, the body 16 may be a temperature responsive member which undergoes a variation in length with changes in temperature. In this case, the scale 30 may be calibrated in terms of temperature. Another application which may be mentioned is that of determining strains in frameworks under load, in which case the extension or compression of the body under load may be employed to influence the movement of the magnetic armature element.

It wil be appreciated that the device may be readily calibrated by reference to known magnitudes of the variable or quantity to be measured.

In accordance with the provisions of the patent statutes, I have described the principles of operation of my invention together with the apparatus which I now consider to represent the best embodiments thereof but I desire to have it understood that the apparatus shown and deribed is only illustrative and that the invention may be carried out by other means.

What I claim as new and desire to secure by Letters Patent of the United States is:

1. In combination in an electric measuring device, an electromagnetic gage comprising a magnetic circuit and an inductance coil associated with said magnetic circuit, said magnetic circuit including a plurality of relatively movable magnetic members having a normal position relative to each other and the impedance of said coil being determined by the relative displacement of said magnetic members, means for changing the relative displacement between said magnetic members in dependence upon the magnitude of a quantity to be measured, a chamber accommodating said relatively movable magnetic members and a fluid, said members being relatively movable upon displacement of said fluid, a piston movable within said chamber for displacing said liquid, means for moving said piston for restoring said magnetic members to said normal position relative to each other, and means for obtaining an indication proportional to the degree of operation of said restoring means required to restore said magnetic members to said normal position.

2. In electric measuring apparatus, a Wheatstone bridge network comprising a variable impedance element, said impedance element having a coil, a yoke, and a relatively movable armature, an alternating current source of supply for energizing said bridge, means for moving said armature relative to said yoke and coil for varying the impedance of said element above or below a so-called "normal" value in dependence upon the magnitude of a quantity to be measured whereby an alternating current voltage is provided at the output terminals of said bridge of a polarity dependent upon the sense of change in the magnitude of said impedance from said normal value, electronic amplifying means connected in circuit with said alternating current voltage, reversible electromagnetic means the operation of which is controlled in accordance with the alternating current voltage connected to said amplifying means, means including said electromagnetic means for moving said yoke and coil relative to said armature in order to adjust the impedance of said coil to said normal value, and means for obtaining an indication proportional to the amount of adjustment required.

3. An electromagnetic device for measuring variations in the dimensions of bodies, the said device comprising a Wheatstone bridge circuit having four arms connected in series, said bridge circuit being adapted to be energized by an alternating current source and having output terminals, one of the arms of said bridge including an electromagnet having relatively movable parts for varying the impedance of said electromagnet, means for adjusting the impedance of at least one of said arms to obtain a substantial balance of said bridge, a movable gaging member adapted to change its position in accordance with variations in the dimension of a body being checked, said gaging member being secured to one of said parts so that movement thereof will effect a change in the impedance of said electromagnet to unbalance said bridge, an electronic translating system, connecting means between the output terminals of said bridge and said translating system for impressing on the latter a voltage whose magnitude is responsive to the difference of potential across said output terminals caused by a change in the impedance of said electromagnet and whose polarity is determined by the sense of change of said impedance, a reversible direct current motor, an alternating current source of supply for energizing said motor, means for connecting said motor and said alternating current source of supply in circuit with said translating system, means for operatively connecting said motor to the other of said parts so that movement thereof relative to said first part will readjust the impedance of said electromagnet to restore said bridge to a substantially balanced condition, and means for determining the degree of rotation of said motor required to balance said bridge.

PETER KONRAD HERMANN.